United States Patent
Messinger et al.

(10) Patent No.: US 9,249,543 B2
(45) Date of Patent: Feb. 2, 2016

(54) SURFACING COMPOSITIONS AND METHODS

(75) Inventors: Richard Messinger, Yuma, AZ (US); Gary Havens, Yuma, AZ (US)

(73) Assignee: Gowan Milling Company, L.L.C., Yuma, AZ (US)

( * ) Notice: Subject to any disclaimer, the term of this patent is extended or adjusted under 35 U.S.C. 154(b) by 462 days.

(21) Appl. No.: 12/171,188

(22) Filed: Jul. 10, 2008

(65) Prior Publication Data

US 2010/0008724 A1      Jan. 14, 2010

(51) Int. Cl.
| | | |
|---|---|---|
| *E01C 7/06* | (2006.01) | |
| *C08L 95/00* | (2006.01) | |
| *E01C 7/30* | (2006.01) | |
| *B82Y 30/00* | (2011.01) | |
| *C08J 5/00* | (2006.01) | |

(52) U.S. Cl.
CPC . *E01C 7/30* (2013.01); *B82Y 30/00* (2013.01); *C08J 5/005* (2013.01); *C08L 95/00* (2013.01)

(58) Field of Classification Search
CPC .......... B82Y 30/00; C08J 5/005; C08L 95/00; E01C 7/30
USPC ....................... 404/77; 524/60, 446
See application file for complete search history.

(56) References Cited

U.S. PATENT DOCUMENTS

| | | | | |
|---|---|---|---|---|
| 3,912,669 | A  * | 10/1975 | Hendrix | 524/59 |
| 5,502,030 | A  * | 3/1996 | Patel | 507/126 |
| 5,811,477 | A  * | 9/1998 | Burris et al. | 524/60 |
| 2004/0168611 | A1* | 9/2004 | Dresin et al. | 106/273.1 |
| 2005/0009961 | A1* | 1/2005 | Burris et al. | 524/59 |
| 2009/0264561 | A1* | 10/2009 | Carlson | 524/68 |

* cited by examiner

*Primary Examiner* — David W Wu
*Assistant Examiner* — Marie Reddick
(74) *Attorney, Agent, or Firm* — Quarles & Brady LLP; Gavin J. Milczarek-Desai

(57) ABSTRACT

Asphalt surfacing compositions and methods involving asphalt millings, water, and an amount of a polyvinyl alcohol sufficient to bind the millings such that a load-bearing asphalt paving surface is formed upon application of the composition to a material are provided.

6 Claims, No Drawings

SURFACING COMPOSITIONS AND METHODS

BACKGROUND OF THE INVENTION

1. Field of the Invention

The present invention concerns surfacing compositions, and, more particularly, improved surfacing compositions for paving asphalt roadways, paths, and other areas.

2. Description of the Related Art

When roads are rehabilitated, typically material is milled and removed and replaced by newly made asphalt material. Thus, so-called "hot mix" is brought to the construction site and placed on the milled area. One disadvantage with this process is that it is time consuming because it requires two operations. In one operation, the road is milled up, and the material is removed. Then, in the second operation, the "hot mix" asphalt is transported to the site and placed on the milled pavement. Another disadvantage with such a process is that the milled material is often not reused. Still other disadvantages include that hot asphalt can be difficult and messy to work with and worker's health and safety are of major importance, in that the addition of hot asphalt adds significantly more volatile organic compounds (VOC's).

Some attempts have been made to recycle the bituminous material that makes up the road and use them in rehabilitation operations. However, these processes are believed to have consistency problems that result in undesired performance. Moreover, environmental concerns have caused legislation to be enacted that prohibits the use of petroleum additives to recycled bituminous materials in some areas. And most recently, the cost escalation of petroleum products has made a tremendous impact on resurfacing and surface maintenance of existing asphalt roadways.

SUMMARY OF THE INVENTION

The invention generally relates to surfacing compositions and methods that include asphalt millings, water, and an amount of a polyvinyl alcohol sufficient to bind millings such that a load-bearing asphalt paving surface is formed after the composition is applied.

In one aspect, compositions of the invention further include a clay, such as a nano clay, and/or a crosslinker material that is compatible with polyvinyl alcohol.

In another aspect, compositions of the invention include recycled asphalt pavement and are substantially free of non-milled asphalt. Preferably, compositions of the invention and the resulting paving surface made therefrom are formed free of exogenously added heat (i.e., heat added by a contractor), with no addition of petroleum products or additional sources of VOC's.

In one preferred embodiment, the surfacing composition includes asphalt millings at optimum moisture (i.e., enough moisture such that the millings are moist and pliable, which typically involves a moisture content of 5 to 20% by weight, preferably, 7%-20% by weight), and an amount of polyvinyl alcohol determined based on the total weight of asphalt millings (typically 4-10% by volume PVOH of the total moisture content), wherein the proportion of asphalt, water, and polyvinyl alcohol is sufficient to bind the millings such that a load-bearing asphalt paving surface is formed upon application of the composition to a material in need thereof. In addition, a cross linking agent may be added.

The invention also involves methods for the preparation of an asphalt paved surface. In one embodiment, the method includes the steps of: (a) providing a milled asphalt composition, with the composition containing asphalt millings, water, and an amount of a polyvinyl alcohol sufficient to bind the millings such that a load-bearing asphalt paving surface is formed upon application of the composition to a material in need thereof; and (b) compacting the composition of step (a) on such a material (for example, a roadway, roadway shoulder, parking lot, sidewalk, traverse areas at manufacturing plants, a path, temporary construction areas, patches, or any other area requiring asphalt surfacing).

The methods of the invention also involve recycling an existing asphalt surface, i.e., the existing asphalt surface is removed and provided as millings for step (a) above.

Various other purposes and advantages of the invention will become clear from its description in the specification that follows. Therefore, to the accomplishment of the objectives described above, this invention includes the features hereinafter fully described in the detailed description of the preferred embodiments, and particularly pointed out in the claims. However, such description discloses only some of the various ways in which the invention may be practiced.

DETAILED DESCRIPTION OF THE PREFERRED EMBODIMENTS

The invention pertains to surfacing compositions that include asphalt millings, water, and an amount of a polyvinyl alcohol sufficient to bind the millings such that a load-bearing asphalt paving surface is formed upon application of the composition to a material in need of same. A polyvinyl alcohol is a water-soluble synthetic polymer having the structure $(C_2H_4O)_x$.

Preferably, crosslinker materials such as urea, boron, urea/boron combinations, cement, and similar materials are added to further improve the cohesiveness of the composition. Crosslinking forms a bond that links one polymer chain to another. Such bonds can be covalent bonds or ionic bonds.

Advantageously, asphalt waste millings are used in compositions of the invention to form improved asphalt compositions. Asphalt millings (also known as bituminous concrete) are created when existing asphalt paving is removed. Generally, asphalt millings range in size from dust particles to about an inch in diameter and contain between approximately 5-7% asphalt.

The market for such millings has been mostly limited to use as a base layer because of its lack of suitability for use in new surface paving applications. For example, new asphalt is used as a binder to bind aggregates using in paving applications. However, asphalt millings do not bind as well unless new bitumen or another binder is added, and the overall quality of the millings can vary widely depending on asphalt character, age, weather, and other site-specific conditions. Also, environmental issues are another factor that now is a consideration for reclaiming asphalt millings.

Moreover, the ability of asphalt or asphalt millings to bind at all is dependent upon heating the asphalt to a temperature that is sufficiently hot to make the asphalt pliable and adhesive. Such "hot-process" or "hot mix" application of asphalt as a paving surface is messy and gives off volatile organics, among other disadvantages.

The compositions and methods of the invention provide a way to recycle asphalt into new surfacing compositions. Furthermore, the compositions preferably are formed and applied "cold," i.e., without any exogenous heat being added by a contractor in order to work with the surfacing composition. Thus, a "cold process" application is achievable with good results. In addition to saving energy, cold process application of compositions of the invention do not result in a sticky/molten mess—the paved surface can walked on immediately, and is not "oily" or "gooey." Moreover, the odor given off by VOC's is minimized.

In some embodiments, a clay is added to compositions of the invention. Particularly preferred are so-called Nano clay particles. Nano clay, known as hydrated sodium calcium aluminum silicate or (Na, Ca)(Al,Mg)6(Si4O10)3(OH)6-nH20, is a clay mineral having a 2:1 expanding crystal lattice. Isomorphous substitution causes a net permanent charge balanced by cations in such a manner to give very plastic properties. Added Nano-clay can range preferably from 0.75% to 5% by weight or possibly even greater depending on the application. Thus, in one test embodiment, 0.75% Nano-clay by weight was added to 1 gallon of "TMAX" PVOH in water solution (weight is 8.7 lbs.), which would amount to ~1 oz. of Nano-clay particles.

A preferred surfacing composition of the invention includes asphalt millings at optimum moisture (typically 7%-20% by weight) and a determined amount of a polyvinyl alcohol as follows. The asphalt millings are brought up to a moisture level where they are moist and pliable. Since not all asphalt millings are exactly the same (i.e., the original asphalt is made from crushed rock with added asphalt, and the crushed rock can be different depending upon its geological origin), asphalt millings can and do have different bulk densities.

Typical bulk densities for asphalt millings can be in the range of weighing from 2400 to 3000 lbs per cubic yard. Thus, the 7%-20% moisture level by weight is one that the inventors have found to work on a number of the asphalt millings that have been tested. For example, if a cubic yard of millings weighs 3000 lbs, then the projected amount of water needed would be 3000×7%=210 lbs of water. If 210 lbs of water is divided by 8.34 (the lbs of water in a gallon), the result is 25 gallons of total volume to be added to the one cubic yard (3000 lbs) of asphalt millings.

Next, PVOH is added to the asphalt and moisture composition. In the scenario above, 1 gallon of PVOH (16% PVOH and 84% water) is added (typically 0.85 gallons of a per yd$^3$ of millings, but has been found to range from 0.4-1.2 gallons per yd$^3$ of millings depending on material and site conditions) and then thoroughly mixed in the asphalt millings to provide an even coating of all material. Resultant material should adhere in a lump when picked up and squeezed in one's hand and leave a tacky residue on the hand when the material is released. This material is ready to be put down on a site and after proper compaction and will produce a smooth, even, and adequate load bearing surface with minimal cure time. Thus, the proportion of asphalt, water, and polyvinyl alcohol is sufficient to bind the millings such that a load-bearing asphalt paving surface is formed upon application of the composition to a material in need of construction, repair or replacement.

The invention also related to methods for the preparation of an asphalt paved surface, comprising the steps of:

(a) providing a milled asphalt composition, the composition containing asphalt millings, water, and an amount of a polyvinyl alcohol sufficient to bind said millings such that a load-bearing asphalt paving surface is formed upon application of the composition to a material in need thereof; and (b) compaction of the composition of material to the required density specifications for the project.

EXAMPLES

The present invention is further illustrated by the following non-limiting examples.

Example 1

Testing of a Composition of the Invention

A series of test blocks were built. Block dimensions were 1 ft$^2$ and 3' thick. Rates of TL16 (PVOH plus 10% by weight of a urea cross linking agent) addition were at 75 GPA (Gallons Per Acre); 100 GPA; 200 GPA and 1500 GPA were mixed in a 3 ft$^3$ cement mixer into the asphalt millings after the millings were brought to 7% moisture by weight. Each test block was built separately and put into individual blocks in 1' lifts and hand tamped with each lift. The resultant blocks were allowed to cure and then evaluated for strength and binding characteristics. The four blocks were placed outside in the elements and allowed to cure for eleven months. The blocks were removed and evaluated in May, 2007. The 75 GPA rate crumbled when removed from the mold. The 100 GPA rate had more stability but was easily broken. The 200 GPA rate had good binding characteristics. The 1500 GPA rate created a concrete-like block, however from an economic standpoint was deemed unlikely to be useful.

Example 2

Follow-Up Testing

A test road surface was built. Roadway is 365 ft. in length and 26 ft. wide using TL MAX (a 16% PVOH solution in water and including 10% Urea as a crosslinker) was mixed in 116 yd$^3$ of asphalt millings at the rate of 85 gallons TL per 100 yd$^3$ after 7% moisture, by weight, added to asphalt millings. The asphalt millings used had an excessive amount of fines (sand) compared to the material used by the city of Prescott on their projects. The finished roadway had an acceptable appearance. Due to the material used and some equipment problems the finished roadway surface has not held together as well as the Prescott streets. It appears that the stability is such that chip sealing of the roadway would cure the deterioration problem most likely caused by the excessive fines in the asphalt millings. A portion of the roadway was chip sealed (Feb. 8, 2008) and is being evaluated as to surface stability comparative to the original unsealed roadway that is "raveling".

Example 3

Method for Making Paving Compositions

Step 1:
Asphalt millings are brought to optimum moisture (Typically 7% by weight).

Step 2:
Mix a solution of polyvinyl alcohol and water, with 7% PVOH and 93% water. Apply and mix this solution thoroughly into a known weight of asphalt millings. Total volume of solution to be added to asphalt millings is 3.7% (Prescott Protocol) of known asphalt weight, i.e., 3000 lbs. of asphalt millings will require (3000×3.7%=111 lbs. total volume of solution. Terra max quantity=111×7%=7.8 lbs terra max divided by 8.7 lbs. (weight of 1 gallon of terra max)=0.9 gal. TLMax+103.2 lbs. Water divided by 8.34 lbs (weight of 1 gallon of water)=12.4 gals. of water.

Step 3:
After solution has been thoroughly mixed into asphalt millings, the prepared material should be stockpiled and allowed to cure for 15 to 24 hours (Prescott Protocol), prior to delivering to project site. Use conventional asphalt paving techniques (e.g., compacting) to construct desired surface to specifications.

Preparation of the asphalt materials have been accomplished in a variety of ways, but not limited to the following:
- By hand for small areas
- Barrel type concrete mixers
- 100 yd$^3$ batches in windrows with grader and loader
- 200 yd$^3$ batches in windrows and on the flat using grader and loader The use of other machinery and means of introducing invention into material also may be suitable, e.g., using Pugmill or an All-in-One Machine. Mixing of the inventive composition to provide a uniform coating of the asphalt millings will determine the resultant effective stability of roadway surface. Laydown can be accomplished by conventional means with no sticky mess, easy clean-up, and no known hazardous fumes produced.

Various changes in the details and components that have been described may be made by those skilled in the art within the principles and scope of the invention herein described in the specification and defined in the appended claims. Therefore, while the present invention has been shown and described herein in what is believed to be the most practical and preferred embodiments, it is recognized that departures can be made there from within the scope of the invention, which is not to be limited to the details disclosed herein but is to be accorded the full scope of the claims so as to embrace any and all equivalent processes and products. All references cited in this application are hereby incorporated by reference herein.

What is claimed is:

1. A surfacing composition comprising asphalt waste millings, said waste millings containing crushed rock bound with asphalt, and further including 5%-20% by weight based on the weight of the asphalt waste millings of water and 0.4-1.2 gallons per yd$^3$ of said asphalt waste millings of a polyvinyl alcohol, wherein the proportion of asphalt waste millings, water, and polyvinyl alcohol is sufficient to bind said waste millings such that a load-bearing asphalt paving surface is formed upon application of the composition to a material in need thereof.

2. The composition of claim 1, further including 0.75% to 5% by weight, based on the weight of the polyvinyl alcohol of a clay.

3. The composition of claim 2, wherein said clay comprises a nano clay.

4. The composition of claim 1, further including 4-10% by weight, based on the weight of the polyvinyl alcohol of a crosslinker.

5. The composition of claim 4, wherein said crosslinker is selected from the group consisting of a carbamide, boron, and cement.

6. The composition of claim 1, wherein said composition and said paving surface are formed free of exogenously added heat.

* * * * *